(12) United States Patent  
Bhalla

(10) Patent No.: US 7,286,196 B1
(45) Date of Patent: Oct. 23, 2007

(54) LCD WITH COMPLIMENTARY HETEROGENEOUS POLARIZERS FOR POLARIZATION LIGHT RECYCLING

(75) Inventor: Jagmohan Bhalla, Washington, DC (US)

(73) Assignee: Vitera LLC, Washington, DC (US)

( * ) Notice: Subject to any disclaimer, the term of this patent is extended or adjusted under 35 U.S.C. 154(b) by 0 days.

(21) Appl. No.: 11/618,254

(22) Filed: Dec. 29, 2006

(51) Int. Cl.
    G02F 1/1335 (2006.01)
(52) U.S. Cl. .................................................... 349/96
(58) Field of Classification Search ............... 349/96
    See application file for complete search history.

(56) References Cited

U.S. PATENT DOCUMENTS

| | | | |
|---|---|---|---|
| 5,917,562 | A | 6/1999 | Woodgate et al. |
| 6,124,971 | A | 9/2000 | Ouderkirk et al. |
| 6,188,460 | B1 | 2/2001 | Faris |
| 6,195,205 | B1 * | 2/2001 | Faris ............... 359/465 |
| 6,243,068 | B1 | 6/2001 | Evanicky et al. |
| 6,262,842 | B1 | 7/2001 | Ouderkirk et al. |
| 6,333,773 | B1 | 12/2001 | Faris |
| 6,448,955 | B1 | 9/2002 | Evanicky et al. |
| 6,515,785 | B1 | 2/2003 | Cobb, Jr. et al. |
| 6,573,961 | B2 | 6/2003 | Jiang et al. |
| 6,738,114 | B1 | 5/2004 | Faris |
| 6,801,270 | B2 | 10/2004 | Faris et al. |
| 6,829,071 | B2 | 12/2004 | Allen et al. |
| 6,831,720 | B2 | 12/2004 | Jiang et al. |
| 6,833,891 | B2 | 12/2004 | Jiang et al. |
| 6,888,675 | B2 | 5/2005 | Ouderkirk et al. |
| 6,912,018 | B2 | 6/2005 | Faris et al. |
| 6,934,082 | B2 | 8/2005 | Allen et al. |
| 6,975,455 | B1 | 12/2005 | Kotchick et al. |
| 7,038,745 | B2 | 5/2006 | Weber et al. |
| 2001/0028422 | A1 | 10/2001 | Tsujimura et al. |
| 2002/0113921 | A1 | 8/2002 | Jiang et al. |
| 2003/0164914 | A1 | 9/2003 | Weber et al. |
| 2004/0105046 | A1 | 6/2004 | Taira et al. |

(Continued)

FOREIGN PATENT DOCUMENTS

EP     1655634     5/2006

(Continued)

OTHER PUBLICATIONS

Tanase et al.; J. res. Develop.; vol. 42 No. 3/4 (1998) "A New Backlighting System Using a Polarizing Light Pipe".

(Continued)

*Primary Examiner*—David Nelms
*Assistant Examiner*—Richard H Kim
(74) *Attorney, Agent, or Firm*—Womble Carlyle

(57) ABSTRACT

An electro-optical display system includes a rear reflective heterogeneous polarizer having first and second regions. The first region transmits a first polarization state and reflect a second polarization state and the second region transmits the second polarization state and reflects the first polarization state. The system further includes a front heterogeneous polarizer having third and fourth regions. The third region is substantially aligned with and approximately the same size and shape as the first region and the fourth region is substantially aligned with and approximately the same size and shape as the second region.

14 Claims, 3 Drawing Sheets

U.S. PATENT DOCUMENTS

| | | |
|---|---|---|
| 2005/0002098 A1 | 1/2005 | Allen et al. |
| 2005/0002472 A1 | 1/2005 | Lee et al. |
| 2005/0007515 A1 | 1/2005 | Faris |
| 2005/0062906 A1 | 3/2005 | Ishizaki |
| 2005/0270439 A1 | 12/2005 | Weber et al. |
| 2006/0055844 A1 | 3/2006 | Mi |
| 2006/0098140 A1 | 5/2006 | Lee |
| 2006/0109398 A1 | 5/2006 | Mi |
| 2006/0187650 A1 | 8/2006 | Epstein et al. |

FOREIGN PATENT DOCUMENTS

| | | |
|---|---|---|
| WO | WO98/11275 | 9/1997 |
| WO | WO 00/70400 | 5/2000 |
| WO | WO 2005/029168 | 9/2004 |
| WO | WO 2006/055469 | 11/2005 |

OTHER PUBLICATIONS

Suzuki; J. Soc. Inf. Display 7, 157 (1999) "Two approaches to the luminance enhancement of backlighting units for LCDs".

Hochbaum et al.; SID Symposium Digest 30, 1063 (1999) "Cholesteric Color Filters: optical Characteristics, Light Recycling, and Brightness Enhancement".

Kubota et al.; SID Symposium Digest 33, 333 (2002) "Simulation Study of Light Emission of a Backlight System with a Broad Band Cholesteric Liquid Crystal Polarizer".

Jagt et al.; J. Soc. Inf. Display 10, 107 (2002) "Linearly polarized light-emitting backlight".

Jagt et al.; SID Symposium Digest 33, 1236 (2002) "Microstructured Polymeric Linearly Polarized Light Emitting Lightguide for LCD Illumination".

Mi et al.; SID Symposium Digest 36, 1004 (2005) "Low Fill-Factor Wire Grid Polarizers for LCD Backlighting".

Adachi et al.; SID Symposium Digest 36, 1285 (2005) Late-News Paper "Light Out-Coupling Enhancement of OLEDs by a Polarized Light Recycling Structure".

Zhu et al.; IEEE Journal of Display Technology vol. 1 No. 4, (2005) "Transflective Liquid Crystal Displays".

\* cited by examiner

LCD WITH COMPLIMENTARY HETEROGENEOUS POLARIZERS FOR POLARIZATION LIGHT RECYCLING

FIELD OF THE INVENTION

One embodiment of the present invention is directed to a liquid crystal display. More particularly, one embodiment of the present invention is directed to a liquid crystal display having polarization light recycling.

BACKGROUND INFORMATION

A liquid crystal display ("LCD") is a thin, flat display device made up of any number of color or monochrome pixels arrayed in front of a light source or reflector. It has many advantages over competing technologies because it uses very small amounts of electric power and is therefore suitable for use in battery-powered electronic devices, and because of its thinness.

Each pixel in an LCD consists of a layer of liquid crystal ("LC") molecules suspended between two transparent electrodes, and sandwiched between two crossed linear polarizers (i.e., polarizers with axes of transmission which are perpendicular to each other). Without the liquid crystals between them, light passing through one polarizer would be blocked by the other. The liquid crystals act as polarization modifying light valves by changing the polarization state of the light coming from the rear polarizer. In order to function in this manner, the liquid crystal molecules must be correctly aligned so that they accept light of the polarization state transmitted by the rear polarizer and can rotate it to the polarization state that is transmitted by the front polarizer. Various techniques are known for achieving the appropriate alignment of the liquid crystal molecules. These include mechanical rubbing, which introduces microscopic grooves, or use of oriented linearly polarized UV illumination of an appropriate alignment layer substrate. Application of an electric field, by applying a voltage to the transparent electrodes, can modify the degree of polarization rotation, thus enabling fine control of the light passing through the pixel. The operation of LCDs depends on the correct relationship between the axis of transmission of the rear polarizer, the alignment of the liquid crystal layer (both for light entering and leaving) and the axis of transmission of the front polarizer.

The pixels by themselves do not generate light and therefore an LCD requires external illumination, either from ambient sources for a "reflective" LCD or from a backlight for a "transmissive" LCD (or from a combination in the case of a "transflective" LCD). A large portion of the power consumption of a transmissive LCD is devoted to the backlight. However one problem with known transmissive LCDs is that the vast majority of this power is expended in producing light that is ultimately not used in the display output, since it is filtered out. A typical light yield (i.e., the fraction of generated light that is transmitted by a fully active pixel) of these known LCDs is approximately 5%-7%.

Light loss that is intrinsic to LCD designs is typically due to the following elements (assuming illumination from an unpolarized white source):
  color filter set: approximately 28% transmission;
  aperture ratio: approximately 70% transmission; and
  rear and front polarizers: approximately 40% transmission.

Color filters are required since backlight typically generate white light. The aperture ratio arises since some of the area of an LCD does not transmit light.

Polarization losses arise from intrinsic aspects of the design of LCDs. As has been described, LCDs require illumination to be linearly polarized and appropriately oriented, which typically results in the loss of at least half of the light available from the backlight.

Various attempts have been made to improve the light yield of LCDs, which could greatly improve the electrical efficiency of LCDs, therefore enabling more power efficient appliances, extending battery life for mobile devices, reducing needed backlight illumination components since fewer or lower power lamp elements would be needed to provide a certain level of brightness, and improving heat management in display units since much of the lost light is absorbed as heat. One method of improving light yield is through polarization light recycling, disclosed in, for example, U.S. Pat. No. 7,038,745. FIG. 1 is a cross-sectional view of a typical prior art transmissive LCD 10 which includes polarization light recycling in order to improve the light yield. FIG. 1 shows only those elements directly involved in light recycling and does not show many other elements often found in LCDs (e.g., color filters, prism sheet, diffusers, etc). LCD 10 includes a liquid crystal layer 17. Liquid crystal layer 17 is sandwiched by a homogenous front polarizer 19 and a homogenous rear reflective polarizer 18. Rear polarizer 18 transmits light of a first polarization ("P1") and reflects light of a second polarization ("P2"). Front polarizer 19 is crossed with rear polarizer 18 (i.e., has perpendicular transmission axes) and transmits P2 light. Liquid crystal layer 17 functions as a plurality of polarization modifying light valves (i.e., pixels) each of which can rotate incident P1 light to include a P2 component, depending on the amount of applied voltage. LCD 10 further includes a backlight unit 11 that includes a backlight 12 for generating unpolarized white light, a rear reflector 14 for reflecting light, and a light guide 30 for guiding and homogenizing generated and reflected light.

In operation, backlight unit 11 produces a uniform distribution of white unpolarized illumination that includes both P1 and P2 light (arrow 20). This light is incident on homogenous rear reflecting polarizer 18 that transmits one polarization P1 (arrow 21) and reflects the majority of the other component, P2 (arrow 23), back into backlight unit 11. LC layer 17 converts some of the polarization of arrow 21 to P2 light and transmits that as arrow 24, of which the P2 light portion is ultimately transmitted by homogeneous front polarizer 19 as arrow 25.

Meanwhile, in backlight unit 11, elements such as rear reflector 14 convert P2 of arrow 23 so that it now has components of both P1 and P2 (arrow 26), thus allowing an increase in the amount of "recycled" P1 (arrow 27) available for transmission. A portion of the recycled P1 (arrow 27) is converted to recycled P2 (arrow 28) by LC layer 17, which is ultimately transmitted (arrow 29) by homogenous front polarizer 19. This process is repeated many times to increase the total amount of P2 light transmitted to the viewer. Commercial versions of the recycling technology shown in FIG. 1 are known to increase the light yield by approximately 30%.

Based on the foregoing, there is a need for an LCD system that has an improved light yield relative to known systems.

SUMMARY OF THE INVENTION

One embodiment of the present invention is an electro-optical display system that includes a rear reflective heterogeneous polarizer having a first and a second region. The first region transmits a first polarization state and reflects a second polarization state and the second region transmits the second polarization state and reflects the first polarization state. The system further includes a front heterogeneous polarizer having a third and a fourth region. The third region is substantially aligned with and approximately the same size and shape as the first region and the fourth region is substantially aligned with and approximately the same size and shape as the second region.

DETAILED DESCRIPTION

One embodiment of the present invention is an LCD with a heterogeneous front and a complementary heterogeneous rear polarizer to achieve substantially improved light yield.

Figure 1:
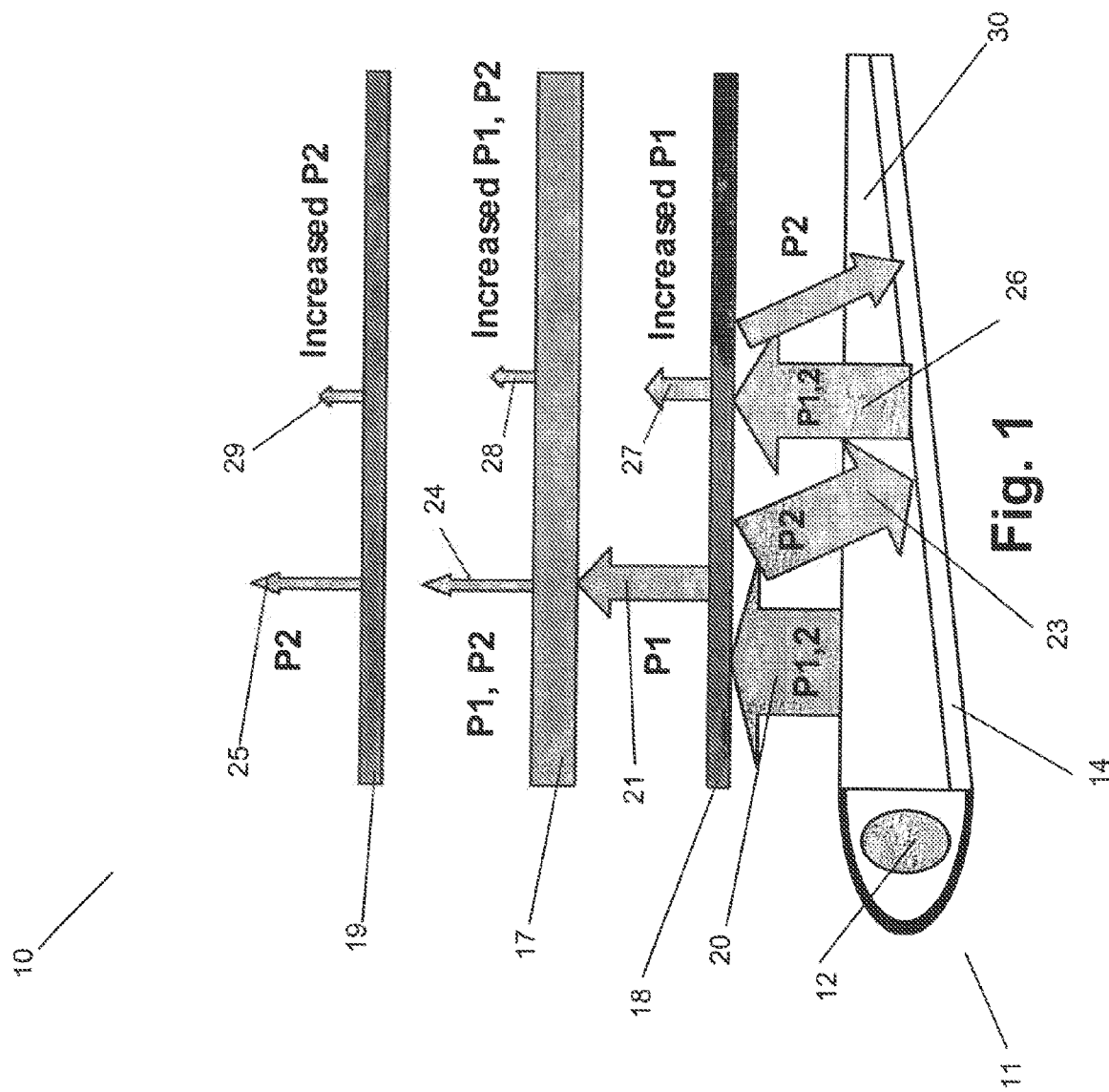
FIG. 1 is a cross-sectional view of a typical prior art transmissive LCD which includes polarization light recycling in order to improve the light yield.
Figure 2:
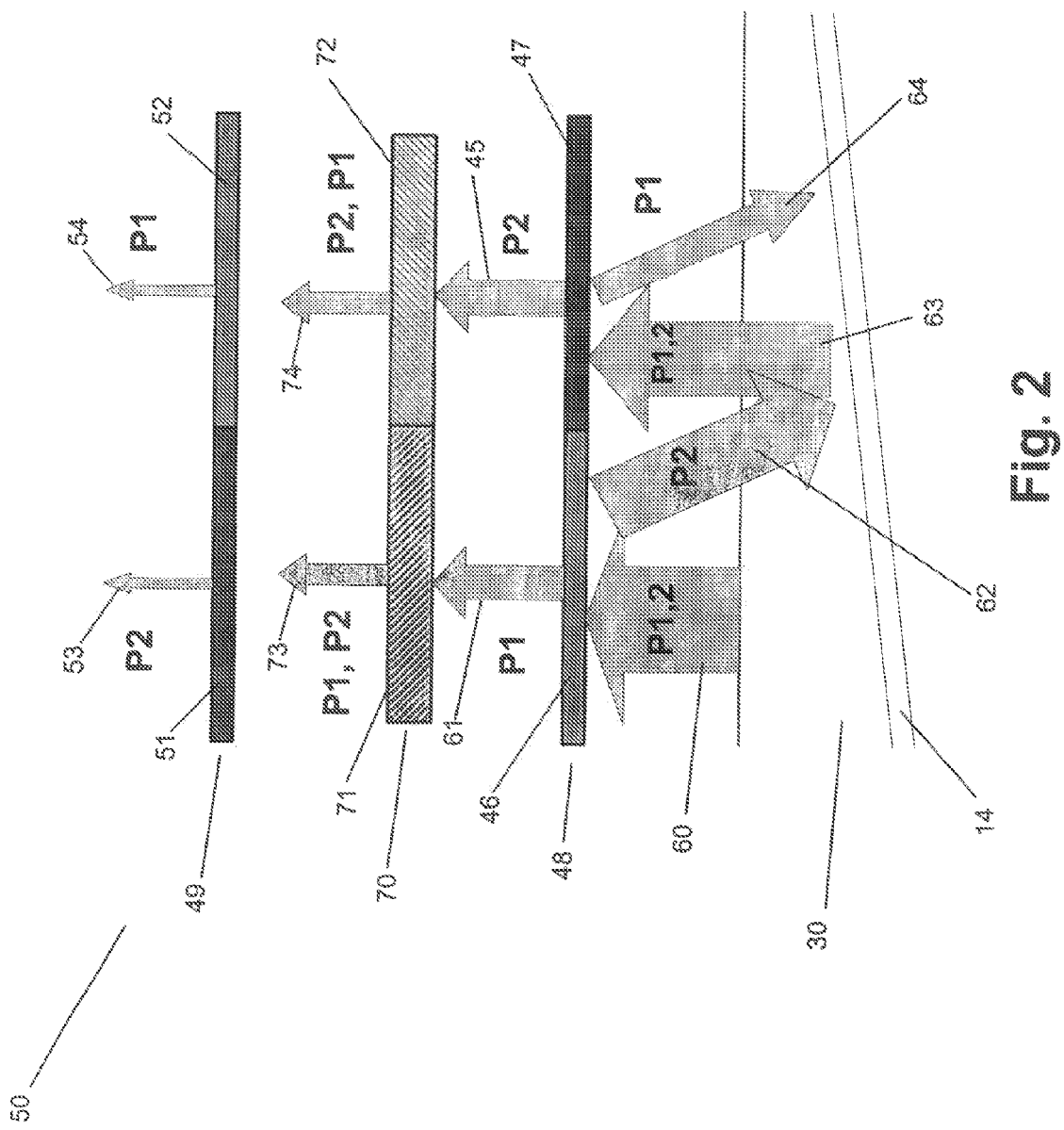
FIG. 2 is a cross-sectional view of a portion of an LCD in accordance with one embodiment of the present invention.

FIG. 2 is a cross-sectional view of a portion of an LCD 50 in accordance with one embodiment of the present invention. FIG. 2 shows only those elements directly involved in one embodiment, and does not show other elements that can be used in combination (e.g., color filter elements, prism sheets, alignment layers, diffusers, other polarizing elements, other reflecting elements, etc). LCD 50 includes a backlight unit that includes a backlight (not shown) for generating unpolarized light, a rear reflector 14 for reflecting light, and a light guide 30 for guiding and homogenizing the generated and reflected light. A rear relative polarizer 48 is heterogeneously polarized with alternating orientation regions, two of which are shown in FIG. 2 (46 and 47). LCD 50 further includes a front polarizer 49 which is heterogeneously polarized with alternating orientation regions, two of which are shown in FIG. 2 (51 and 52) and each regions is complimentary to the corresponding region of rear polarizer 48 (e.g., region 46 transmits only P1 light and region 51 transmits only P2 light). Regions 46 and 51 are of approximately the same shape and size. Regions 47 and 52 are approximately the same shape and size.

LCD 50 further includes an LCD layer 70 that includes regions 71 and 72 that are each appropriately oriented to the corresponding regions of rear polarizer 48 and front polarizer 49. In one embodiment, LC layer 70 is formed of Twisted Nematic liquid crystals that have an orientation dependence such that they must be appropriately aligned with respect to the transmission axes of both the front and rear polarizers. Given that one embodiment of the present invention has alternating regions of orientations of both front and rear polarizers, LC regions 71 and 72 should also have alternating orientations. This type of "alignment" can be accomplished by either mechanical rubbing (i.e., creation of micro grooves) or by using oriented linearly polarized UV.

In operation, the backlight unit produces a uniform distribution of unpolarized illumination that includes both P1 and P2 light. Some of this light (arrow) 60) is incident on region 46 of heterogeneous rear reflective polarizer 48 that transmits one polarization P1 (arrow 61) and reflects the majority of the other component, P2 (arrow 62), back towards the backlight unit. LC layer 70 (specifically region 71) converts some of the polarization of arrows 61 to P2 light and transmits as arrow 73, of which the P2 light portion is ultimately transmitted by front polarizer 49 (specifically though region 51) as arrow 53.

Meanwhile, rear reflector 14 converts P2 of arrow 62 so that it now has components of both P1 and P2 (arrow 63), of which the "recycled" P2 portion (arrow 45) is transmitted by region 47 of rear reflective polarizer 48. A portion of the recycled P2 is converted to recycled P1 (arrow 74) by region 72 of LC layer, which is ultimately transmitted (arrow 54) by region 52 of front polarizer 49. This process is repeated many times such that light reflected from the rear polarizer 46 (either P1 or P2 light depending on which region of polarizer 46 it is reflected by) can be reflected and recycled many times until it is ultimately transmitted by an appropriate region of the present invention, thereby enabling an increase in total light transmitted by the LCD. Embodiments of the present invention do not depend on the ability of rear reflector 14 to convert between polarization states. Rather, embodiments would be effective even if the rear reflector did nothing more than reflect, since by multiple reflections each polarization state would ultimately reach a region through which it could be propagated.

Figure 3:
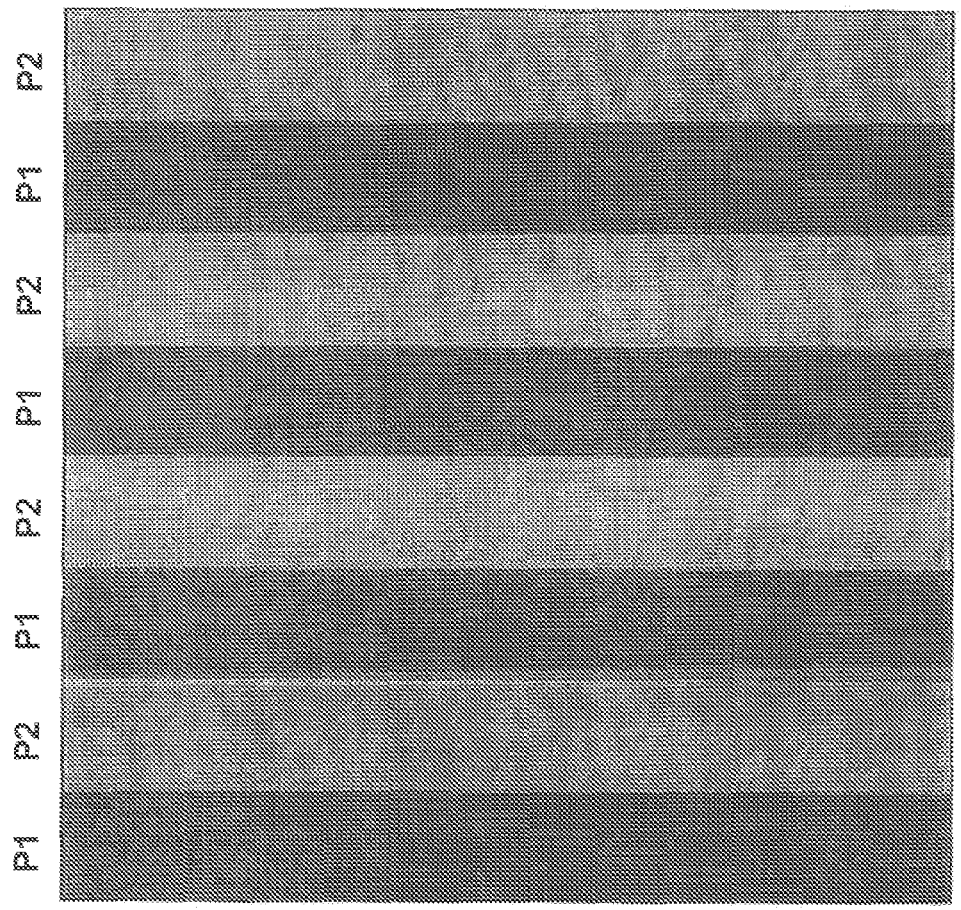
FIG. 3 is a top view of a heterogeneous front polarizer in accordance with one embodiment of the present invention.

FIG. 3 is a top view of heterogeneous front polarizer 49 in accordance with one embodiment of the present invention. As shown, polarizer 49 includes alternating orientation regions. As disclosed, rear polarizer 48 has a similar pattern of alternating regions that are the same shape and size as those of the front polarizer 49 but are complimentary with each region being crossed with its corresponding region. LC layer 70 also has a similar pattern of alternating regions with the relevant alignment directions.

The patterned heterogeneous regions of polarizers 48 and 49 can be of any shape or size that is convenient to manufacture. In one embodiment, the aggregate area of each orientation covers approximately 50% of the total display area. In other embodiments, the shape and layout of heterogeneous regions can be optimized to take advantage of the properties of elements of the backlight unit and to also optimize evenness of illumination.

In one embodiment, rear heterogeneous polarizer 48 is non-absorbing, and front polarizer 49 is any type as long as the regions are the same shape and size and complementary to the equivalent regions of rear polarizer 48. Other components typically used in LCDs and backlights, such as color filters, diffusers, compensating films, prism sheets, collimating sheets etc., may also be used in conjunction with embodiments of the invention. Any of these additional elements that requires a matched polarization orientation should also have appropriate heterogeneous regions.

Heterogeneous polarizers such as polarizers 48 and 49 are known. For example, in the specialized area of 3D stereoscopic displays, heterogeneously polarized output is used to encode and present different images to the right and left eyes of observers, which are then decoded by using suitable complementary polarized eye glasses. In these known systems, a heterogeneously polarized output is used to deliver different perspectives to the left and right eyes of observers by adding a patterned polarizing layer to the front of an otherwise conventional electro-optical display. These systems typically use either a micro-polarized array that is alternating for adjacent pixels or narrow strips of the display or alternating phase retarder regions to give distinctly circularly polarized views to each eye. However, these known systems do not include both rear and front heterogeneous polarizers.

The incorporation of more than one polarization orientation in embodiments of the present invention allows more total light to be output by polarization light recycling. Prior art polarization recycling has relied on homogeneously polarized reflective rear polarizers and reflection or other recycling or conversion techniques to convert a portion of the untransmitted light to a state that can be transmitted. In contrast, embodiments of the present invention do not have to rely on polarization conversion of the untransmitted light. Therefore, embodiments of the present invention are not limited by the efficiency of the conversion process. This theoretically enables near zero polarization losses, which can substantially improve power efficiency and panel brightness.

Patterned alignment regions in LCD panels such as LCD layer 70 of FIG. 2 and methods of manufacturing them are known. For example multi-domain pixels have been designed to improve contrast and viewing angles in which the pixels are divided into more than one domain, each of which has different alignment directions, although all are homogeneously polarized. Known manufacturing methods for creating these differently aligned domains are used in one embodiment to manufacture the patterned alignment regions of LC layer 70 (e.g., regions 71 and 72) that match the respective heterogeneous regions of the patterned polarizers 48 and 49.

In one embodiment, complementary regions of the front and rear polarizers 48 and 49 and related LC layer 70 patterns should be designed so that interfaces between adjacent regions of the heterogeneous polarization are not visible. To achieve this, in one embodiment boundaries can be arranged to be in areas of the panel that are between pixel elements of the display.

Embodiments of the present invention can be implemented for any electro-optical display technology using a light modulation unit that depends on polarization modification to enable its light valves to work. These light modulation units can be pixilated (i.e., have a regular array of pixels of the same shape and size), or they can have other patterns, where the elements are of different shapes and sizes, such as a "seven segment" display as commonly used in watches. The light modulation unit can be of any type, including liquid crystal such as Twisted Nematic, Super Twisted Nematic or non Nematic liquid crystal.

The present invention can be utilized with black and white displays, color displays and 3D displays. It can be utilized with any backlight source technology, including Cold Cathode Fluorescent Lamps ("CCFL"), electroluminescent or Light Emitting Diodes ("LED"). For backlights with LEDs, embodiments of the present invention provide particular advantages for manufacturers of displays since the number of lamp units can be reduced, enabling LED backlights to compete for larger display segments. Further, embodiments of the present invention can be used in combination with other known methods of improving efficiency and performance, such as color display schemes that incorporate a white sub pixel (disclosed, for example, in U.S. Pat. No. 6,989,876), field sequence color filterless displays which use multiple monochromatic primary color strobed light sources to avoid losses from color filters (disclosed, for example, in U.S. Pat. No. 6,480,247) and multi-domain vertical alignment LCDs. Such displays still suffer from large polarization losses and hence can benefit from embodiments of the present invention.

Several embodiments of the present invention are specifically illustrated and/or described herein. However, it will be appreciated that modifications and variations of the present invention are covered by the above teachings and within the purview of the appended claims without departing from the spirit and intended scope of the invention.

For example some embodiments may include transmission axes of the front and rear polarizer regions that are parallel. Further, some embodiments may use more than two orientations of primary axes of transmission in the heterogeneous polarizers and each polarizer can have more than two regions of different polarization orientations. Further, some embodiments of the invention may incorporate heterogeneous polarization elements into the backlight unit, instead of on the rear of the light modulation unit.

What is claimed is:

1. An electro-optical display system comprising: a rear reflective heterogeneous polarizer having a first and a second region, wherein said first region transmits a first polarization state and reflects a second polarization state and said second region transmits the second polarization state and reflects the first polarization state; a front heterogeneous polarizer having a third and a fourth region, wherein said third region is substantially aligned with and approximately the same size and shape as said first region and said fourth region is substantially aligned with and approximately the same size and shape as said second region; and a light modulation unit coupled to said front and rear polarizers, wherein said modulation unit modifies the polarization state of transmitted light, wherein said light modulation unit is a liquid crystal display layer; said layer having fifth and sixth regions that are oriented relative to the first and second regions of said rear polarizer and the third and fourth regions of said front polarizer; wherein said fifth region is substantially aligned with and approximately the same shape and size as said first region and said third region and wherein said sixth region is substantially aligned with and approximately the same shape and size as said second region and said fourth region.

2. The display system of claim 1, wherein said third region transmits the second polarization state and said fourth region transmits the first polarization state.

3. The display system of claim 2, wherein said third region reflects the first polarization state and said fourth region reflects the second polarization state.

4. The display system of claim 1, wherein said third region transmits the first polarization state and said fourth region transmits the second polarization state.

5. The display system of claim 1, further comprising a rear reflector.

6. The display system of claim 1, further comprising a backlight unit.

7. A method of operating an electro-optical display system comprising: generating unpolarized light; transmitting the unpolarized light to a rear reflective heterogeneous polarizer having a first and a second region, wherein said first region transmits a first polarizer state and reflects a second polarization state and said second region transmits the second polarization state and reflects the first polarization state; modifying the polarization of rear polarizer light by a liquid crystal layer, wherein said rear polarizer light is transmitted from said rear polarizer; and transmitting the modified light to a front heterogeneous polarizer having a third and a fourth region, wherein said third region is substantially aligned with and approximately the same size and shape as said first region and said fourth region is substantially aligned with and approximately the same size and shape as said second region, wherein said liquid crystal layer has a fifth and a sixth region that are oriented relative to the first and second regions of said rear polarizer and the third and fourth regions of said front polarizer; wherein said fifth region is substantially aligned with and approximately the same shape and size as the first region and the third region, and wherein the sixth region is substantially aligned with and approximately the same shape and size as the second region and the fourth region.

8. The method of claim 7, further comprising:
recycling light reflected by the rear heterogeneous polarizer regions with a reflector and redirecting the reflected light back towards the liquid crystal layer.

9. The method of claim 7, wherein said third region transmits the second polarization state and said fourth region transmits the first polarization state.

10. The method of claim 9, wherein said third region reflects the first polarization state and said fourth region reflects the second polarization state.

11. The method of claim 7 wherein said third region transmits the first polarization state and said fourth region transmits the second polarization state.

12. An electro-optical display system comprising: a rear reflective heterogeneous polarizer having a first and a second region; a front heterogeneous polarizer having a third and a fourth region, and a light modulation unit sandwiched between said front and rear polarizers, wherein said first region transmits a first polarization state and reflects a second polarization state and said second region transmits the second polarization state and reflects the first polarization state; and wherein said third region is substantially aligned with and approximately the same size and shape as said first region and said fourth region is substantially aligned with and approximately the same size and shape as said second region, wherein said light modulation unit is a liquid crystal display layer; said layer having a fifth and a sixth region that are oriented relative to the first and second regions of said rear polarizer and the third and fourth regions of said front polarizer; wherein said fifth region is substantially aligned with and approximately the same shape and size as the first region and the third region, and wherein the sixth region is substantially aligned with and approximately the same shape and size as the second region and the fourth region.

13. The system of claim 12, further comprising a rear reflector.

14. The system of claim 12, further comprising a backlight unit.

* * * * *